United States Patent [19]

Thompson et al.

[11] 4,057,466
[45] Nov. 8, 1977

[54] CONDITIONING OF NUCLEAR REACTOR FUEL

[75] Inventors: John Robert Thompson, San Jose, Calif.; Trevor Cartwright Rowland, Halden, Norway; Richard Alan Proebstle, San Jose, Calif.; Edward Rosicky, Fremont, Calif.; Thoma Mees van't Hoff Snyder, Los Altos, Calif.

[73] Assignee: General Electric Company, San Jose, Calif.

[21] Appl. No.: 660,506

[22] Filed: Feb. 23, 1976

Related U.S. Application Data

[63] Continuation of Ser. No. 460,298, April 12, 1974, abandoned.

[51] Int. Cl.$^2$ .............................................. G21C 9/00
[52] U.S. Cl. ................................. 176/38; 176/19 R; 176/20 R
[58] Field of Search ................. 176/19 R, 20 R, 22, 176/24, 38

[56] References Cited

U.S. PATENT DOCUMENTS 3,926,721  12/1975  Lysell .................................... 176/38

OTHER PUBLICATIONS

NEDS-10456, Interim Operating Management Recommendations, pp. 1–46.
Nuclear Engineering Handbook, McGraw Hill, N.Y. (1958) Etherington, pp. 8-29 – 8-31.

Primary Examiner—Samuel W. Engle
Assistant Examiner—S. A. Cangialosi
Attorney, Agent, or Firm—Ivor J. James, Jr.; Samuel E. Turner; Sam E. Laub

[57] ABSTRACT

A method of conditioning the fuel of a nuclear reactor core to minimize failure of the fuel cladding comprising increasing the fuel rod power to a desired maximum power level at a rate below a critical rate which would cause cladding damage. Such conditioning allows subsequent freedom of power changes below and up to said maximum power level with minimized danger of cladding damage.

15 Claims, 10 Drawing Figures

CONDITIONING OF NUCLEAR REACTOR FUEL

This is a continuation of application Ser. No. 460,298, filed Apr. 12, 1974 now abandoned.

BACKGROUND

In well-known commercial nuclear power reactors, the reactor core is of the heterogeneous type, that is, the nuclear fuel is in the form of elongated, cladded rods. These rods or elements are grouped together and supported between upper and lower tie plates to form separately removable fuel assemblies or bundles. A sufficient number of such fuel assemblies are arranged in a matrix, approximately a right circular cylinder, to form the nuclear reactor core capable of self-sustained fission reaction. The core is submersed in a fluid, such as light water, which serves both as a coolant and as a neutron moderator. A plurality of control rods, containing neutron absorbing material, are selectively insertable among the fuel assemblies to control the reactivity, and hence the power level of operation, of the core. In some reactors, for example, the boiling water type, the power level also can be adjusted by changing the rate of coolant flow through the nuclear core.

Typically, the above-mentioned fuel rods or elements comprise a sealed tube, formed of a suitable metal such as a zirconium alloy, containing a plurality of sintered pellets of an oxide of a suitable fuel, such as uranium oxide, as shown, for example, by J. L. Lass et al in U.S. Pat. No. 3,365,371. The tube, sealed by end plugs, thus serves as a cladding to isolate the nuclear fuel from the moderator-coolant and to prevent the release of fission products.

The tubular fuel rod cladding, which may be of the order of 0.032 inches in thickness, is subjected to severe service because of the high pressure, high temperature and nuclear radiation in the environment of the nuclear reactor core. Fuel elements of the type under discussion, in general, have given reliable performance. However, some fuel elements failures have occurred for several reasons.

(The term "failure" is herein meant to indicate that the fuel rod cladding has developed one or more openings, cracks or holes which permit escape of fission products from the fuel element into the surrounding coolant.)

One type of failure that has been observed is characterized by longitudinal, brittle splits or cracks in the cladding generally occurring adjacent fuel pellet interfaces or adjacent cracks in the pellets. It is presently believed that such failures are primarily caused by mechanical interaction between the fuel pellets and the cladding during certain conditions of fuel operation!. Thus, this type of failure is designated pellet-cladding interaction failure. More specifically and as presently understood, the circumstances of likely pellet-cladding interaction failure are briefly as follows: During exposure (burnup) in the fuel, the fuel pellets expand or swell. The pellets also become distorted in shape. In particular the pellets tend to take on an "hour-glass" shape as opposed to their original cylindrical shape. In other words, the pellet tend to expand more at their ends than at their centers. Additionally the end surfaces of the pellets tend to become convex with the result that adjacent pellet edges move away from one another. Irradiation also lowers the ductility of the cladding.

Thus a sudden large change in the power level of irradiated fuel can cause relatively rapid swelling of the fuel pellets against the cladding. If the expanding, separating edges of adjacent pellets (or adjacent sides of a pellet crack) lock against the cladding, the resulting localized strain may exceed the ultimate strain of the embrittled cladding with resulting cracking to produce the pellet-cladding interaction failure.

It is obviously highly desirable to eliminate or at least to minimize the incidence of such pellet-cladding interaction failures.

SUMMARY

An object of the present invention is to provide a method of conditioning the fuel in a reactor core to a predetermined maximum power level of operation so that subsequent relatively rapid changes in power level (particularly power increases) below and up to this maximum power level can be made with minimum risk of pellet-cladding interaction fuel rod failures.

This and other objectives are accomplished by taking advantage of the discovery that reactor fuel can be conditioned for subsequent high power operating level changes by a method of systematically increasing the local power of the fuel in the high power range (that is, within the power range of fuel pellet-cladding interaction) at or below a discovered critical rate. It is found that such power increase, at or below the discovered critical rate, provides a gradual, long-term, accommodation between the cladding and the fuel pellets, in response to the stresses created by expanding fuel pellets, without cladding failure. By "long-term" is meant that the accommodation persists for a significant period of time, perhaps not indefinitely-depending on operating conditions, but for at least a period of time sufficient for practical application of the conditioning method in commercial nuclear reactor core operation.

DRAWING

The invention is described in greater detail hereinafter with reference to the accompanying drawing wherein.

DESCRIPTION

Figure 1:
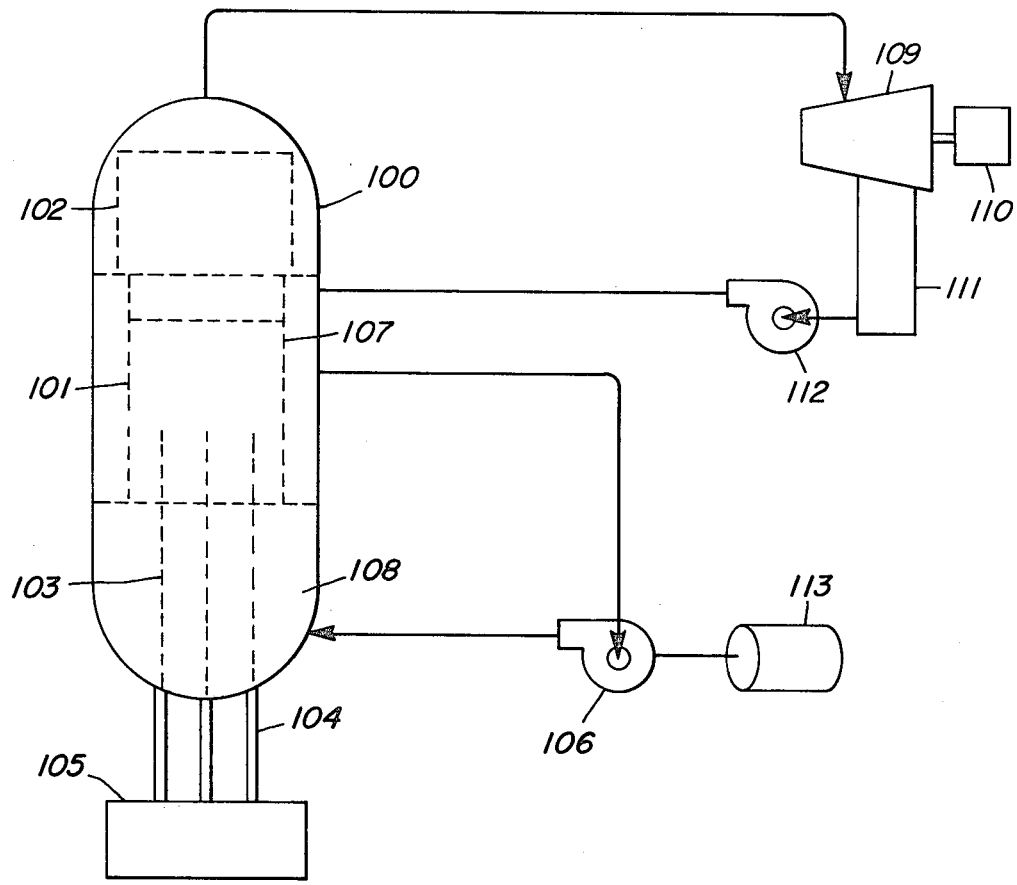
FIG. 1 is a schematic illustration of a boiling water nuclear reactor system.

Although not limited thereto, the invention is described herein as employed in a nuclear reactor of the boiling water type. A typical power plant employing a direct cycle boiling water reactor is schematically illustrated in FIG. 1. A pressure vessel 100 contains a nuclear fuel core 101 and steam separating and drying apparatus 102. (The pressure vessel is normally housed in a thick-walled containment building, not shown). A plurality of control rods 103 may be reciprocated by drive devices 104 into and out of the core 101 to control the reactivity thereof. A rod selection and control system 105 controls the operation of the control rod drive devices 104.

The vessel 100 is filled with a coolant (for example, light water) to a level somewhat above the core 101.

The coolant is circulated through the core 101 by a circulation pump 106 which receives coolant from a downcomer annulus 107 and forces it into a plenum 108 from which the coolant flows upward through the fuel assemblies of the reactor core. The heat produced by the fuel elements is thereby transferred to the water and a head of steam is produced in the upper portion of the vessel. The steam is applied to a turbine 109, the turbine driving an electrical generator 110. The turbine exhausts to a condenser 111 and the resulting condensate is returned as feedwater to the vessel 100 by a feedwater pump 112.

A variable speed motor or other drive means 113 is provided to drive the circulation pump 106. This provides a means, in addition to the control rods 103, for varying the reactivity of the core 101 over a limited range. More specifically, a reduction in the coolant flow rate causes an increase in the voids and a decrease in the density of the moderator-coolant with a consequent decrease in moderation of neutrons and hence a decrease in the reactivity of the core. Conversely, an increase in the coolant flow rate increases the moderator density and hence the reactivity of the core.

In nuclear reactors of the type under discussion the fuel elements are conveniently formed in the shape of elongated rods formed of a corrosion-resistant, non-reactive material and containing suitable fuel. The fuel elements are grouped together at fixed distances from each other in a coolant flow channel as a fuel assembly or bundle. A sufficient number of the fuel assemblies are arranged in a spaced array to form a nuclear reactor core capable of self-sustained fission reaction.

A typical fuel assembly is formed, for example, by a 7 × 7 array of spaced fuel rods, the fuel rods being several feet in length, on the order of one-half inch in diameter, and spaced from each other by a fraction of an inch. The fuel rods are contained in an open ended tubular flow channel between suitable tie plates. A typical fuel assembly of this type is illustrated, for example, by B. A. Smith et al in U.S. Pat. No. 3,689,358.

Figures 2, 3:
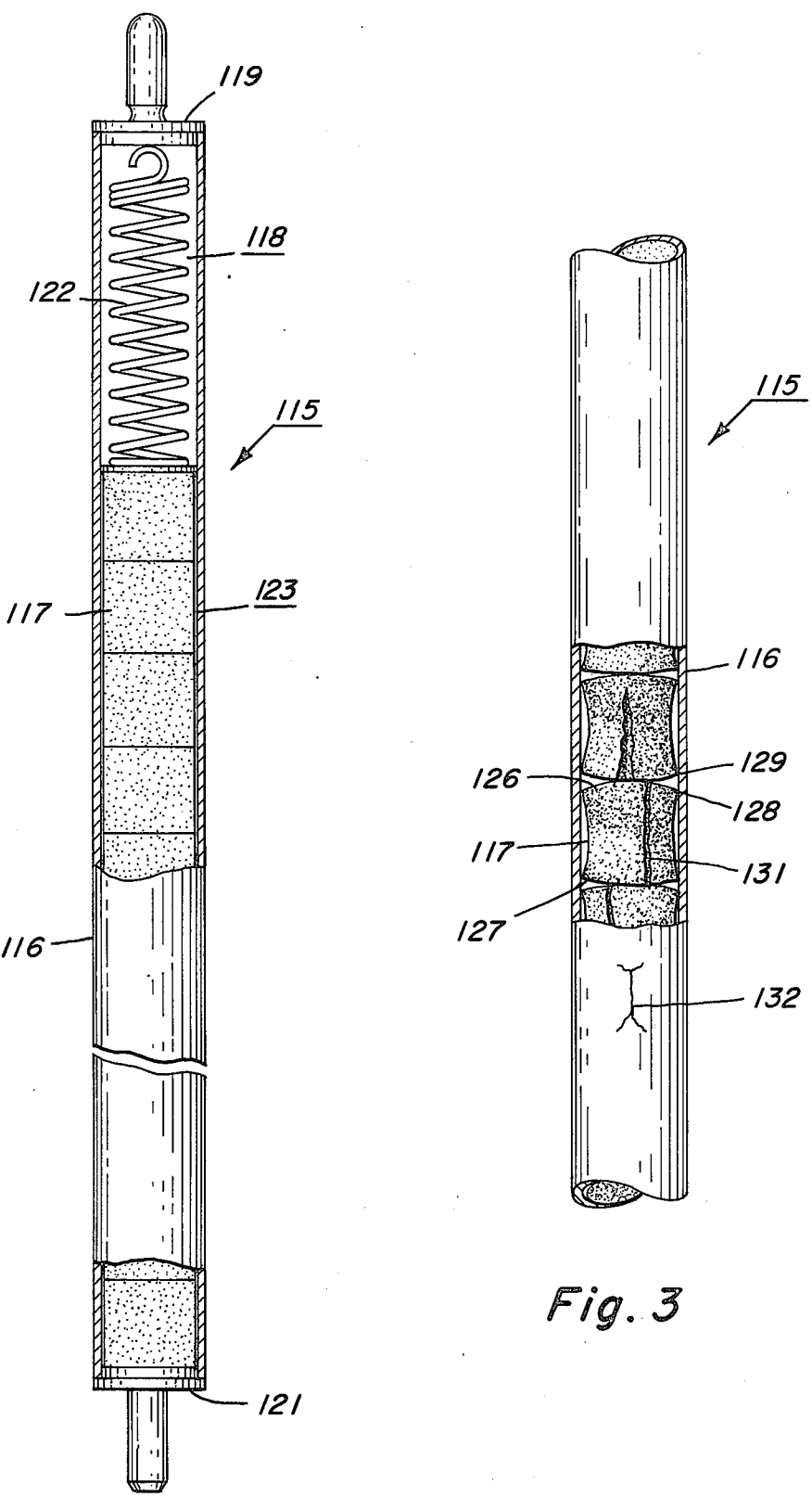
FIG. 2 is an elevation or longitudinal view, partly in cross section, of a typical fuel rod or element.
FIG. 3 is a longitudinal cross section view of a portion of a fuel rod illustrating fuel pellet-cladding interaction.

A typical fuel element or rod 115 is illustrated in FIG. 2. It includes an elongated cladding tube 116 containing a column of fuel pellets 117 and a space or plenum 118 for the collection of fission product gases. The cladding tube 116 is sealed by an upper end plug 119 and a lower end plug 121 and the column of pellets is retained in position by a spring 122 extending through the plenum 118 from the top of the column of fuel pellets 117 to the upper end plug 119.

The cladding tube 116 and the end plugs 119 and 121 are formed of a material suitable for use in a reactor such as an alloy of zirconium. The pellets 117 are preferably formed of an oxide of suitable fuel, such as uranium or plutonium, and the diameter of the pellets 117 is somewhat less than the inside diameter of the cladding tube 116 to provide an initial circumferential clearance or gap 123.

For the type of reactor under discussion the fuel pellets 117 are typically 0.5 – 0.8 inches long and about 0.49 inches in diameter. The cladding tube 116 is typically about 0.564 inches in outside diameter with a wall thickness of about 0.032 inches. This provides an initial radial gap 123 of about 0.005 inches (diametral gap of about 0.010).

Shown in FIG. 3 is a portion of the fuel element 115, partly cut away to illustrate pellet-cladding interaction. As the fuel pellets 117 produce an increasing amount of power (heat) the fuel pellets expand in such a way as to assume an "hour-glass" or spool shape with expanded and bowed ends 126 and 127 as shown in FIG. 3. Eventually the initial clearance 123 is taken up and the pellet edges 128 and 129 contact the inside surface of the cladding tube 116 and pellet-cladding interaction takes place. Further fuel pellet expansion causes circumferential stress in the cladding tube 116 at the points of pellet-cladding interaction. Also, the pellet ends 128 and 129 tend to lock against the cladding tube. Thus further bowing of the ends 126 and 127 causes a longitudinal moving apart of the pellets ends 128 and 129 with resultant longitudinal stress of the cladding tube. In addition, the pellets 117 develop longitudinal cracks 131. The sharp edges of these cracks may produce points of high local stress in the cladding.

For the type of fuel elements under discussion the maximum operating peak power (or linear heat generation rate) is in the order of 16 – 18 kw/ft (kilowatts per foot) and it is found that pellet-cladding interaction occurs in the power range of 6 – 10 kw/ft and above. It has been found that if rapid large changes in power level are made in this pellet-cladding interaction range, the result is a rapid localized strain and stress increase in the cladding, beyond its yield strength, and the cladding may fail by developing cracks such as a characteristic crack 132. The likelihood of pellet-cladding interaction failure is increased with fuel life in a reactor because of the reduction of ductility of the cladding with irradiation.

In accordance with the present invention a method has been discovered for conditioning the fuel so that subsequent rapid changes in power level within the conditioned envelope (that is, up to the maximum power level at which the fuel has been conditioned) can be made with minimized danger of cladding damage (that is, pellet-cladding interaction failure).

Figure 4:
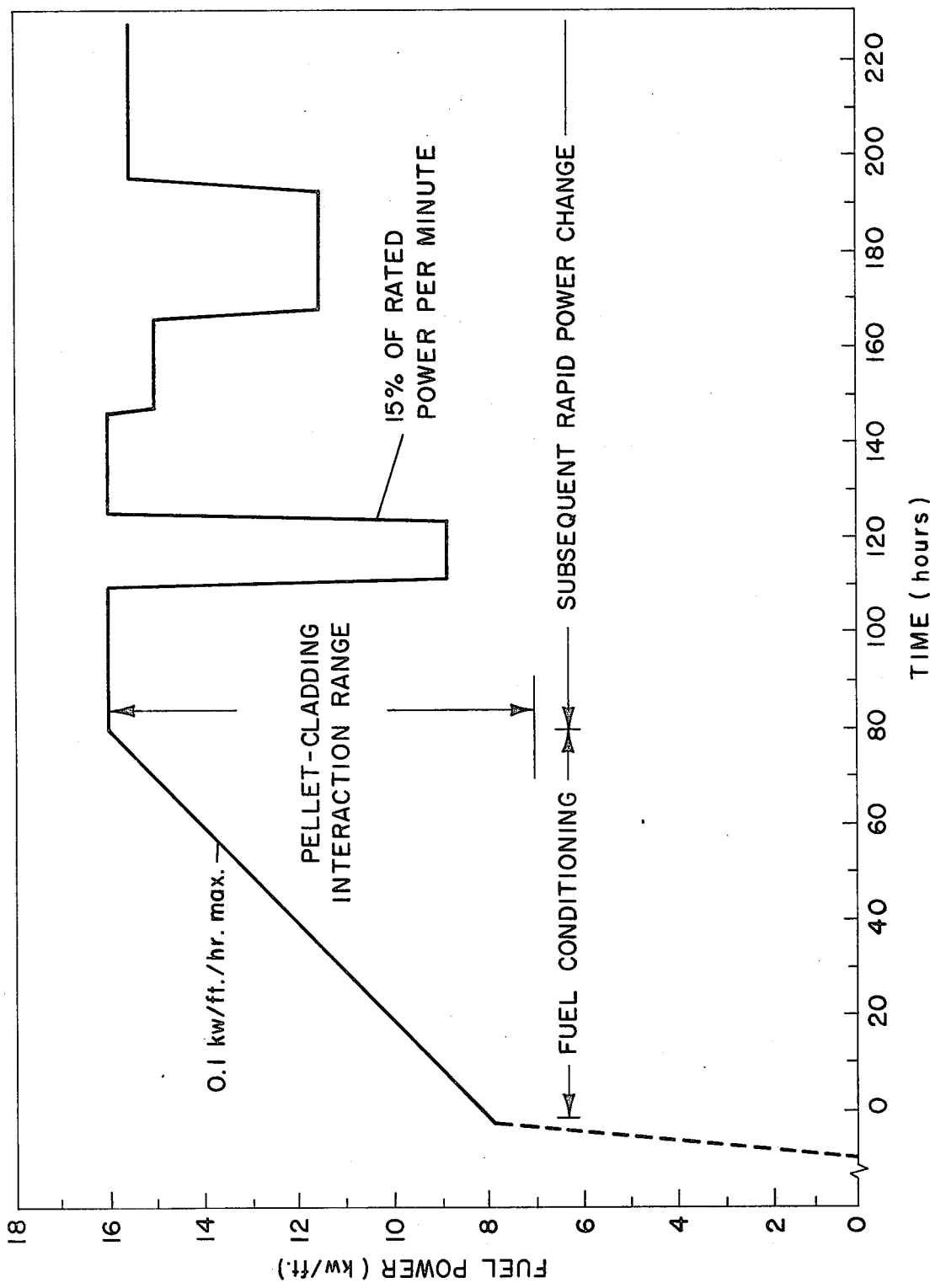
FIGS. 4–10 are power versus time curves of fuel rod irradiation tests demonstrating determination of conditioning rate and the effectiveness of the conditioning method of the invention.

The fuel conditioning method of the invention is illustrated in FIG. 4. It consists of initially increasing the fuel power over the pellet-cladding interaction range to the desired maximum power level at a rate below a critical rate which would cause cladding damage. The maximum rate of this initial power increase has been found to be about 0.1 kw/ft/hr (kilowatts per foot per hour) peak power for the type of fuel elements under discussion.

To the extent now understood it is believed that the resistance of irradiated cladding to cracking when stretched is very dependent on the rate at which it is stretched. Thus, the described initial relative slow increase to power allows the cladding to plastically deform in response to the stresses created by the expanding fuel pellets. It is also believed that the cladding stress is relieved by slow plastic deformation or creep of the fuel pellets under the back forces developed by the stressed cladding. This is particularly the case at higher power levels where the oxide fuel pellets become more plastic. In any case it is found that fuel that is brought to power at the discovered conditioning rate does not fail and, furthermore, that subsequent rapid changes in power level of the fuel (for example, 15 percent of rated power per minute) can be made (for example, as is necessary for load following) as illustrated in FIG. 4 with minimum danger of fuel pellet-cladding interaction failure.

While a continuous rate of initial power increase is illustrated in FIG. 4, in practice it is found more convenient to increase power in a series of steps. It is found that the fuel conditioning method of the invention can be performed in a step fashion if the individual steps or power ramps are sufficiently small. For example, power steps of about 0.1 kw/ft, peak power, have been found practical while steps of 0.5 kw/ft, peak power, appear to be about the maximum allowable.

While the fuel conditioning method herein described allows subsequent rapid power changes, it is further found that this conditioning can be lost if the fuel is subsequently operated at power levels below or near the lower boundary of pellet-cladding interaction for an extended period of time. This loss of conditioning by operation of the fuel at low power levels is thought to result from fuel relaxation, healing of the fuel pellet cracks and relaxation and creep down of the cladding. Thus, after an extended period of operation of the fuel at low power it is found necessary to again condition the fuel for operation at high power levels if fuel pellet-cladding interaction failure is to be avoided.

The time and conditions for loss of conditioning have not been completely determined and appear to depend upon a number of factors including prior high power operation history. In any event, as shown hereinafter, conditioning according to the invention has been found to be effective for a sufficient period to allow practical operation through day-to-day and week end load following.

The invention is further illustrated by the following examples:

EXAMPLE 1

A fuel rod was tested that had been operated in a reactor to an exposure in the order of about 9000–12000 megawatt days per ton. During the last several months of this exposure the peak power in this fuel rod was less than 10 kw/ft. This fuel rod was placed in a test reactor and the power therein was raised rapidly from 10 kw/ft to 14 kw/ft. This fuel rod failed by pellet-cladding interaction.

EXAMPLE 2

Figure 5:
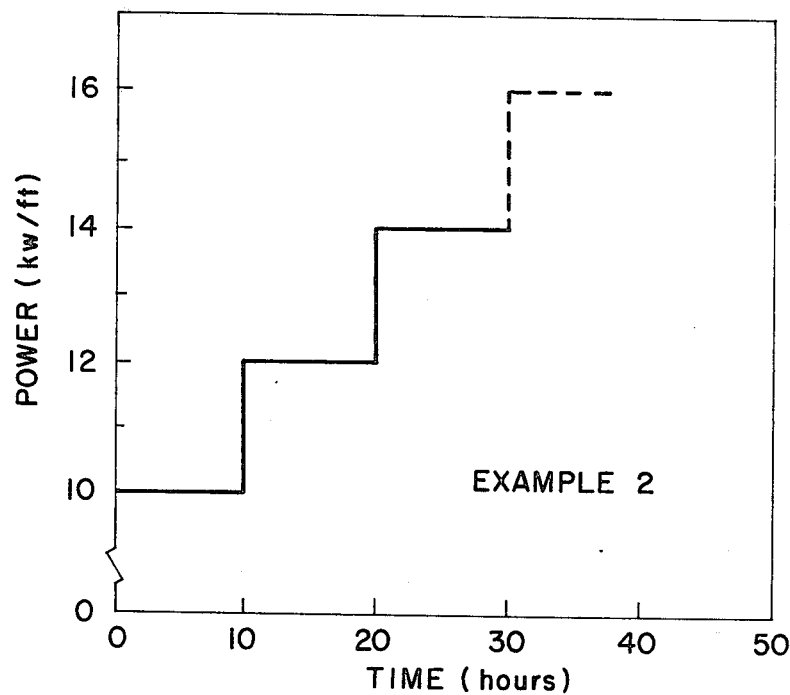

Five fuel rods having operating histories similar to the fuel rod of Example 1 were tested, as shown in FIG. 5, by increasing the power therein from 10 kw/ft in a series of steps of 2 kw/ft with hold periods of 10 hours between steps. All of these fuel rods failed before reaching 16 kw/ft.

EXAMPLE 3

Figure 6:
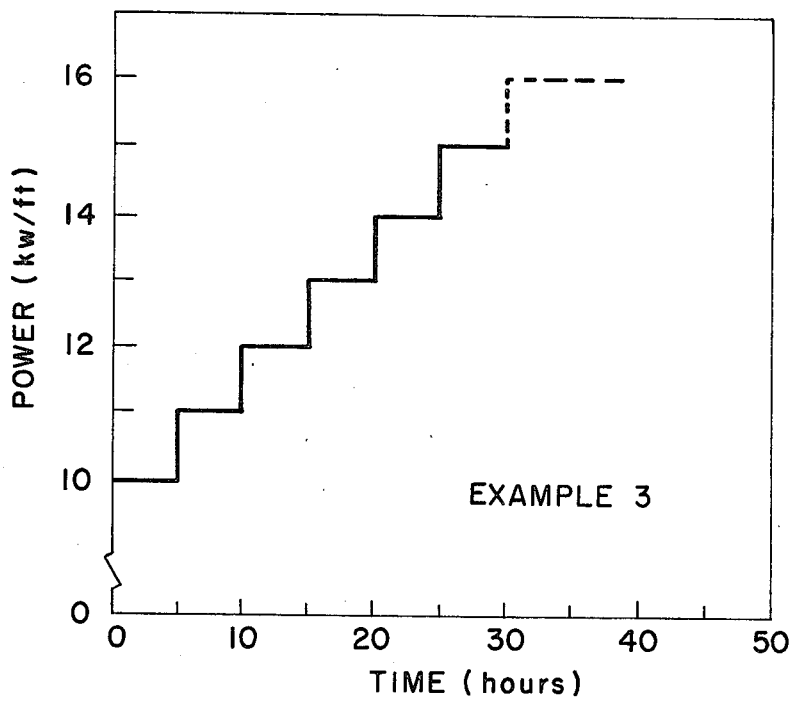

One fuel rod with an operating history similar to the fuel rod of Example 1 was tested, as shown in FIG. 6, by increasing the power therein from 10 kw/ft in a series of steps of 1 kw/ft with hold periods of 5 hours between steps. This fuel rod failed before reaching 16 kw/ft.

EXAMPLE 4

Figure 7:
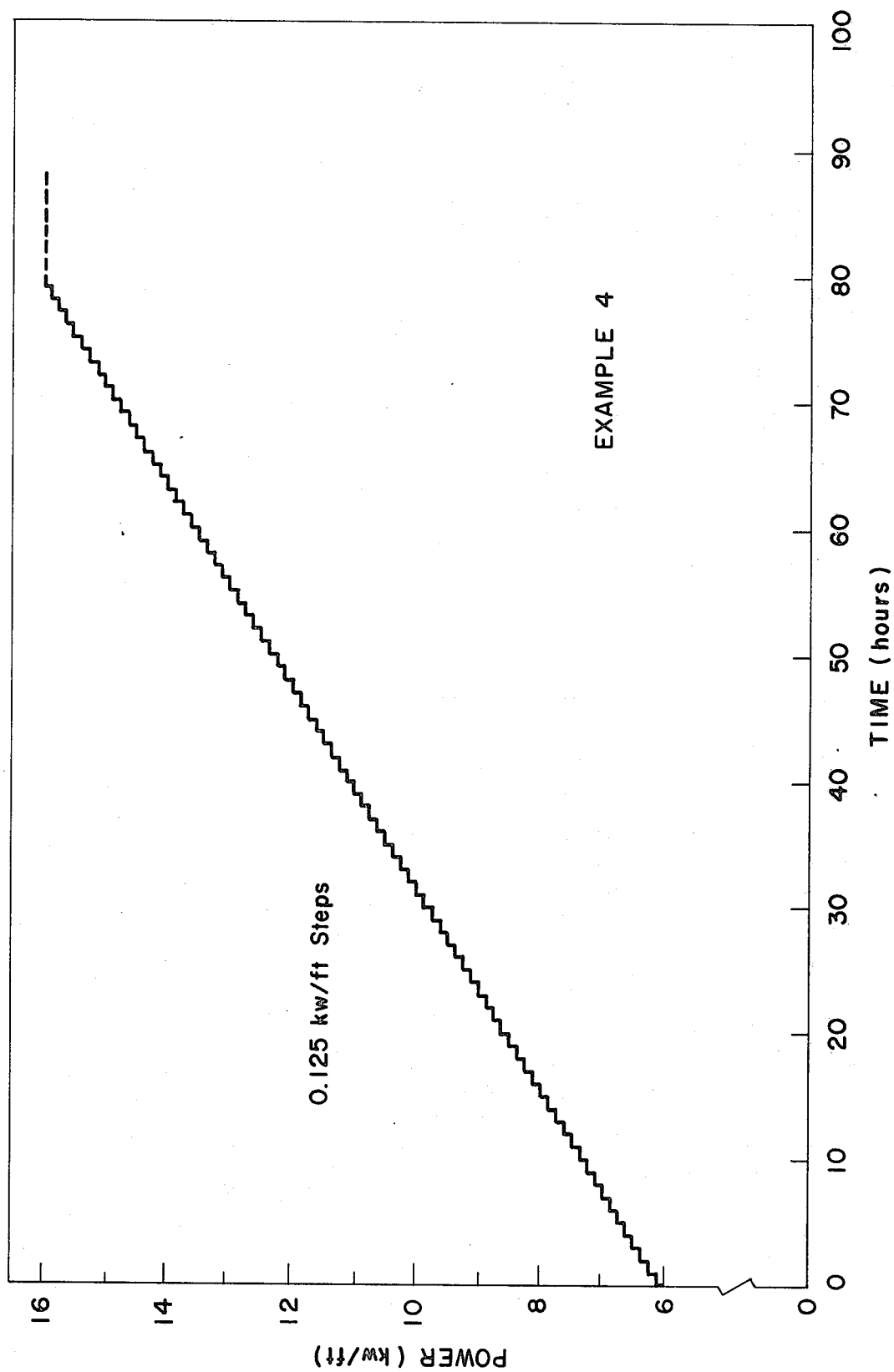

Two fuel rods having operating histories similar to that of the fuel rod of Example 1 were tested, as shown in FIG. 7, by increasing the power therein from about 6 kw/ft in a series of steps of 0.125 kw/ft with hold periods of 1 hour between such steps. These fuel rods failed.

EXAMPLE 5

Figure 8:
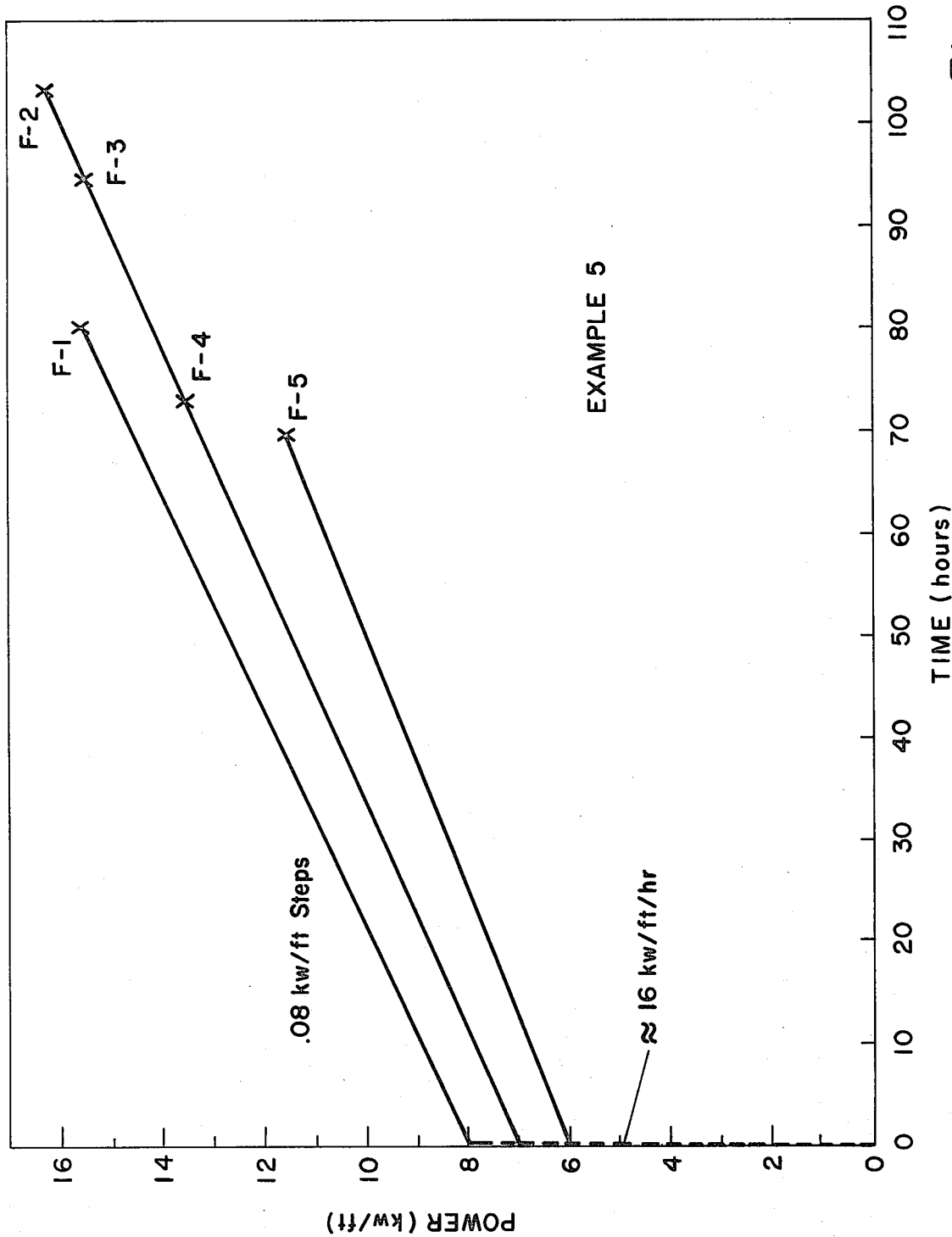

Five fuel rods with exposure histories similar to that of the fuel rod of Example 1 were tested, as shown in FIG. 8 as follows:

In a fuel rod F-1 power was increased therein at a rate of about 16 kw/ft/hr to a power level of about 8 kw/ft. The power therein was then further increased in a series of steps of 0.08 kw/ft with hold periods of 1 hour between steps to a power level of 15.5 kw/ft.

In fuel rods F-2, F-3 and F-4 power was increased therein at a rate of about 16 kw/ft/hr to a power level of about 7 kw/ft. The power therein was then increased in a series of steps of 0.08 kw/ft with hold periods of 1 hour between steps to a power level of 16.2 kw/ft for rod F-2, 15.5 kw/ft for rod F-3 and 13.5 kw/ft for rod F-4.

In a fuel rod F-5 power was increased to about 6 kw/ft at about the 16 kw/ft/hr rate. The power therein was then increased at the 0.08 kw/ft/hour rate in 1 hour steps to a power level of 11.5 kw/ft.

After the foregoing tests these five fuel rods F-1 to F-5 were thoroughly examined. None of these fuel rods had failed nor did they show any evidence of incipient failures.

EXAMPLE 6

A fuel rod with an exposure history similar to that of the fuel rod of Example 1 was tested over the power range from about 7 kw/ft to about 16 kw/ft by increasing the power in a series of steps 0.09 kw/ft with hold periods of 1 hour between steps. Upon subsequent examination this rod showed no evidence of failure.

EXAMPLE 7

Figure 9:
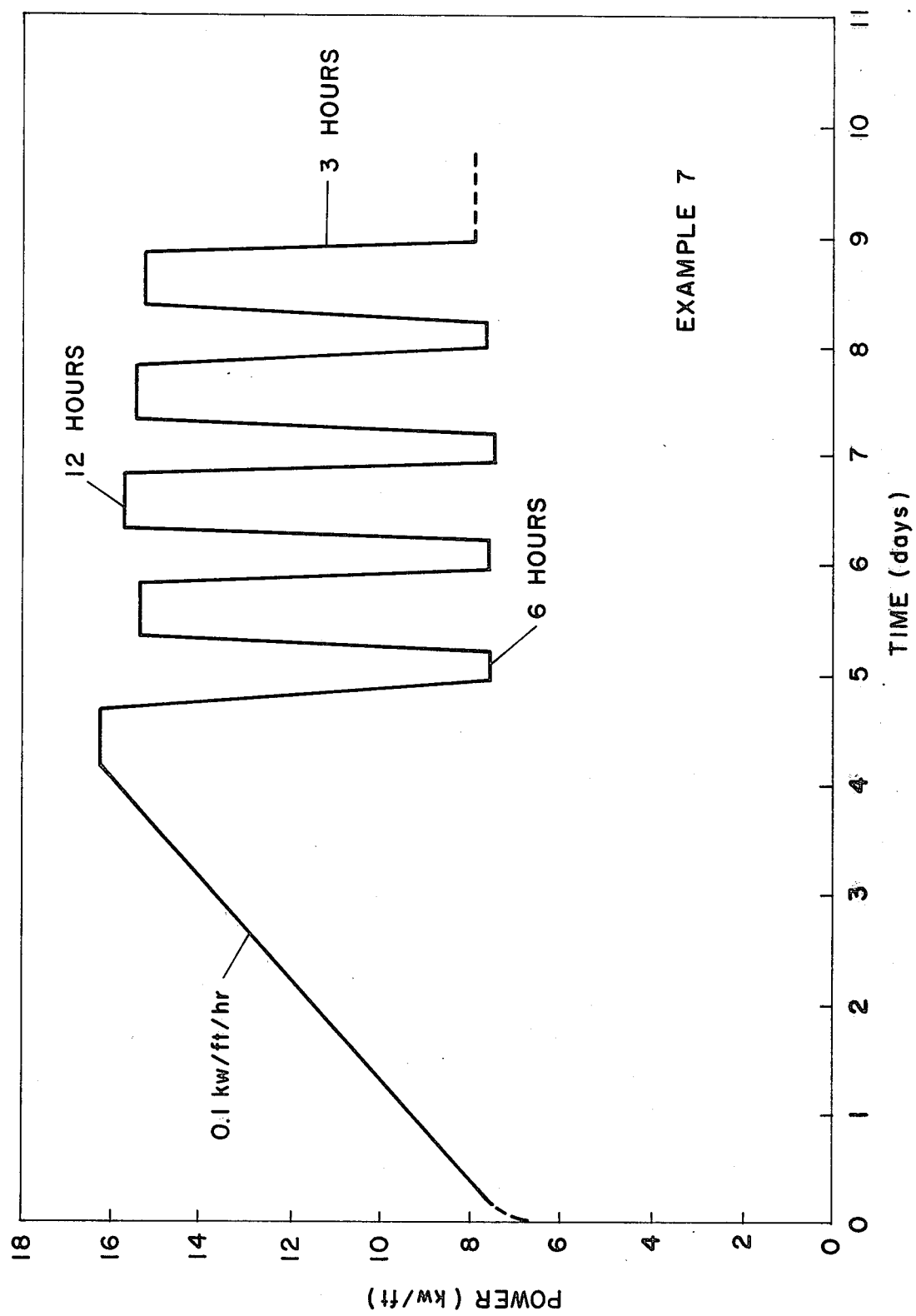

A fuel rod with an exposure history similar to that of the fuel rod of Example 1 was, as shown in FIG. 9, was increased in power from about 7 kw/ft to about 16 kw/ft in a series of steps of about 0.1 kw/ft with hold periods of 1 hour between steps. The power in this fuel rod was cyclically decreased and increased at relatively rapid rates and with hold periods substantially as shown in FIG. 9. Subsequent examination of this fuel rod revealed no evidence of failure. Thus this test demonstrated the ability of the method of the invention to condition the fuel for subsequent large and rapid power changes, as might be required for load following.

EXAMPLE 8

Figure 10:
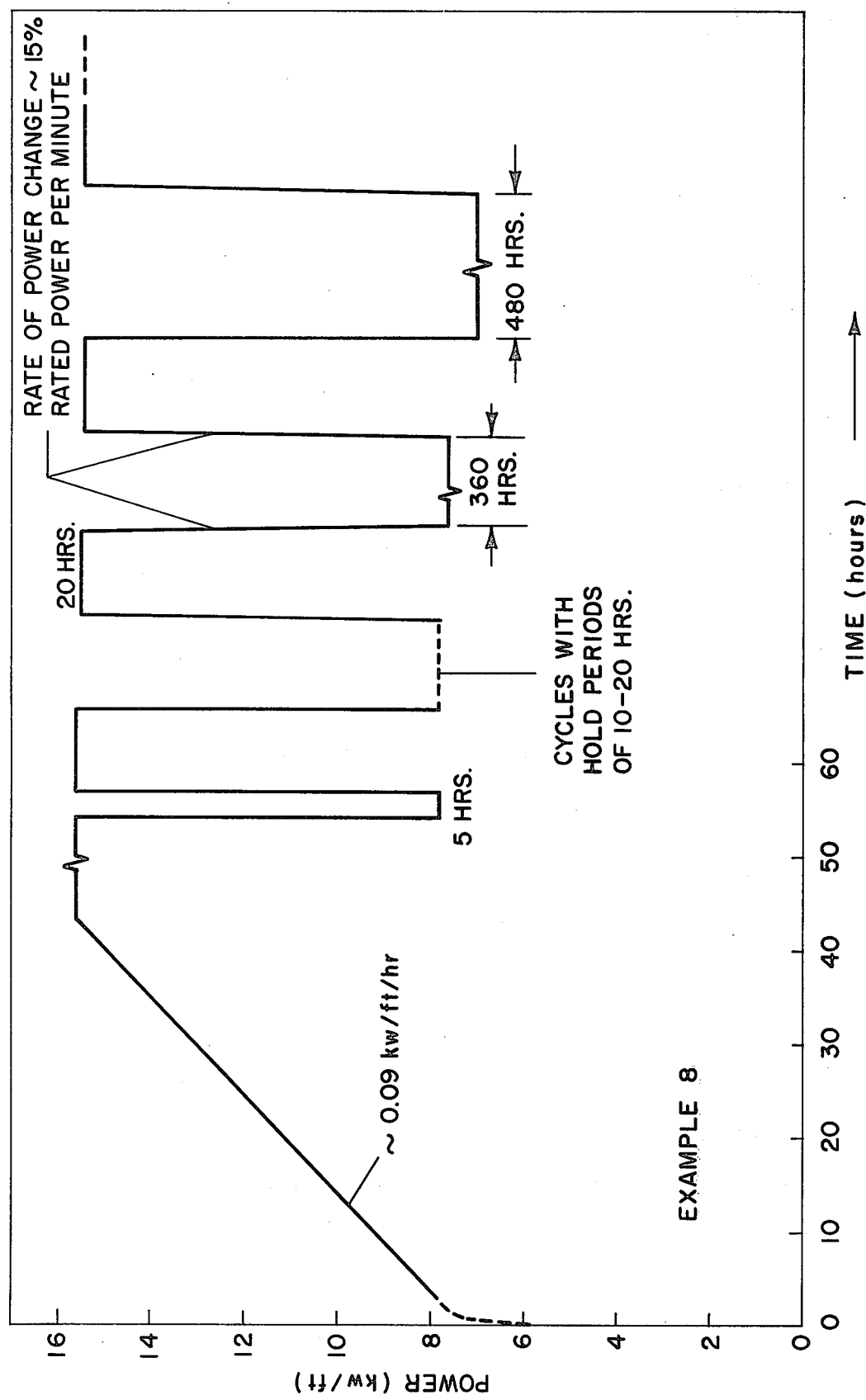

Several fuel rods with exposure histories similar to that of the fuel rod of Example 1 were tested, as illustrated in FIG. 10, by first conditioning the rods according to the method of the invention and thereafter cyclically decreasing and increasing the power therein at relatively rapid rates with various hold times at the lower power levels including hold times of up to 480 hours. None of these rods failed. This test demonstrated that the fuel conditioning persists through at least 480 hours of low power operation, a period more than sufficient to accommodate, for example, load following through a long holiday week end or the like.

In addition to the foregoing examples, the utility and success of the present invention has been confirmed by use of the method of the invention in several commercial power reactors since May 1973. Information from these reactors indicates that use of the conditioning method of invention has allowed subsequent large and rapid changes in power level with significant reduction of fuel rod failures.

While the fuel rod power (linear heat generation rate) of the fuel rods has been expressed herein in terms of kilowatts per foot, other equivalent terms can be used. For example, the fuel rod power alternatively can be expressed in terms of percent of rated power. For example if a fuel rod has a maximum power rating of 16 kw/ft, a rate of power change of 0.6 percent of rated power per hour corresponds to 0.096 kw/ft/hr.

While the method of the invention has been described herein as applied to fuel rods with a fuel pellet diameter in the order of 0.49 inches, the invention is equally applicable to fuel rods of other diameter. Since at a given linear heat generation rate and fuel stress state the fuel creep rate is substantially inversely proportional to the square of the fuel pellet diameter, the conditioning rate (in terms of the rate of increase of the linear heat generation rate) is also inversely proportional to the square of the fuel pellet diameter. Also, the conditioning rate is directly proportional to the stress level of the cladding, hence to the cladding tube thickness to diameter ratio. Therefore, the conditioning rate can be simply generalized as follows:

$$C_r = C_1 \frac{D_1^3}{D_n^3} \frac{T_n}{T_1}$$

where
$C_r$ is the conditioning rate for the fuel rod in question;
$C_1$ is the known conditioning rate for a known fuel rod containing fuel pellets of known diameter $D_1$
$D_1$ is the diameter of the fuel pellets and cladding of the known fuel rod;
$D_n$ is the diameter of the fuel pellets and cladding of the fuel rod in question;
$T_1$ is the cladding thickness of the known fuel rod; and
$T_n$ is the cladding thickness of the fuel rod in question.

As shown hereinbefore, for a fuel rod having a cladding thickness of about 0.032 inches and containing fuel pellets of about 0.49 inches in diameter, the maximum conditioning rate is about 0.1 kw/ft/hr and the critical rate (which is likely to cause cladding failure) is about 0.125 kw/ft/hr. Therefore, the maximum or permissible conditioning rate $C_{rm}$ for a fuel rod of cladding thickness $T_n$ and containing fuel pellets of diameter $D_n$ is:

$$C_{rm} = 0.1 \frac{(0.49)^3}{D_n^3} \frac{T_n}{0.032} \quad (2)$$

Thus, for example, if the pellet diameter is halved and the cladding thickness is the same, the permissible conditioning rate is increased 8-fold. If the cladding thickness is also halved, the permissible conditioning rate is only increased 4-fold.

It is noted that the onset of pellet-cladding interaction (which, as mentioned hereinbefore, occurs in the power range of about 6 – 10 kw/ft for fuel of about 0.49 inches in diameter with 0.032 inch cladding) is substantially independent of the fuel pellet diameter and cladding thickness.

What is claimed is:

1. In a fuel core of a nuclear reactor wherein said fuel consists of a plurality of cylindrical pellets of fuel in oxide form of about 0.49 inches in diameter contained in a plurality of elongated zirconium alloy cladded tubular fuel elements with a cladding thickness of about 0.032 inches and having a range of power output and a maximum power rating, a method of conditioning said fuel elements to withstand subsequent rapid power changes without cladding failure comprising: (1) increasing the power produced by said fuel elements through a fuel pellet-cladding interaction range of power wherein expansion of said pellets and consequent pellet-cladding interaction causes said pellets to exert forces upon said cladding to a selected power level no greater than said maximum power level at a first rate of power increase below a critical rate which causes cladding damage due to said fuel pellet-cladding interaction, said critical rate being about 0.125 kw/ft/hr, and stepwise increases in power at said first rate comprising steps no greater than about 0.5 kw/ft, whereby said fuel elements are conditioned for subsequent rapid power changes up to said desired power level with minimized danger of cladding damage; (2) decreasing the power produced by said fuel elements from said selected power level to a lower power level; and (3) subsequently increasing the power produced by said fuel elements over any portion of the power range of said fuel elements up to said selected power level at a second rate of power increase greater then said critical rate, said second rate of power increase being at least 16 kw/ft/hr.

2. The method of claim 1 wherein said second rate of power increase is at least 15 percent of said maximum power rating per minute.

3. The method of claim 2 wherein power increases at said first rate toward said selected power level are made at a rate no greater than about 0.1 kw/ft/hr.

4. The method of claim 2 wherein power increases at said first rate toward said selected power level are made at a rate of 0.08 – 0.1 kw/ft/hr.

5. The method of claim 2 wherein power increases at said first rate toward said selected power level are made as a series of step increases in power and each of said steps is no greater than about 0.1 kw/ft with a time of no less than 1 hour between said step increases.

6. In a fuel core of a nuclear reactor wherein said fuel consists of a plurality of cylindrical pellets of fuel in oxide form contained in a plurality of elongated zirconium alloy cladded tubular fuel elements having a range of power output and a maximum power rating, a method of operating said fuel elements comprising: (1) increasing the power produced by said fuel elements through a fuel pellet-cladding interaction range of power wherein expansion of said pellets and consequent pellet-cladding interaction causes said pellets to exert forces upon said cladding to a selected power level no greater than said maximum power level at a first rate of power increase below a critical rate which causes cladding damage due to said fuel pellet-cladding interaction, said critical rate being about 0.125 $(0.49)^3/D_n^3$ times $T_n/0.032$ kw/ft/hr and stepwise increases in power at said first rate comprising steps no greater than about 0.5 $(0.49)^3/D_n^3$ times $T_n/0.032$ kw/ft/hr where $D_n$ is the diameter of the fuel pellets and $T_n$ is the thickness of the cladding, whereby said fuel elements are conditioned for subsequent rapid power changes up to said selected power level with minimized danger of cladding failure; (2) decreasing the power produced by said fuel elements to a lower power level below said selected power level; and (3) subsequently increasing the power produced by said fuel elements over any portion of the power range of said fuel elements up to said selected power level at a second rate of power increase above said critical rate, said second rate of power increase being at least about 16 kw/ft/hr.

7. The method of claim 6 wherein said second rate of power increase is at least 15 percent of said maximum power rating per minute.

8. The method of claim 7 wherein said maximum power rating is about 16 kw/ft.

9. The method of claim 6 wherein said critical rate is about 0.125 kw/ft/hr for fuel pellets of about 0.49 inches in diameter.

10. The method of claim 8 wherein power increases at said first rate toward said selected power level are made at a rate no greater than about 0.1 kw/ft/hr.

11. The method of claim 8 wherein power increases at said first rate toward said selected power level are made at a rate of 0.08 – 0.1 kw/ft/hr.

12. The method of claim 8 wherein power increases at said first rate toward said selected power level are made as a series of step increases in power and each of said steps is no greater than about 0.1 kw/ft with a time of no less than 1 hour between said step increases.

13. The method of claim 6 wherein power increases at said first rate toward said selected power level are made at a rate no greater than $0.1\ (0.49)^3/D_n^3$ times $T_n/0.032$ kw/ft/hr.

14. The method of claim 6 wherein power increases at said first rate toward said selected power level are made at a rate of $(0.08\ \text{to}\ 0.1)\ (0.49)^3/D_n^3$ times $T_n/0.032$ kw/ft/hr.

15. The method of claim 6 wherein power increases at said first rate toward said selected power level are made as a series of step increases in power and each of said steps is no greater than about $0.1\ (0.49)^3/D_n^3$ times $T_n/0.032$ kw/ft with a time of no less than 1 hour between said step increases.

* * * * *